(12) United States Patent
Grobecker

(10) Patent No.: US 11,314,090 B2
(45) Date of Patent: Apr. 26, 2022

(54) COVERT TARGET ACQUISITION WITH CODED SHORT-WAVE INFRARED GLASSES

(71) Applicant: ELBIT SYSTEMS OF AMERICA, LLC, Fort Worth, TX (US)

(72) Inventor: Michael Grobecker, Merrimack, NH (US)

(73) Assignee: ELBIT SYSTEMS OF AMERICA, LLC, Fort Worth, TX (US)

( * ) Notice: Subject to any disclaimer, the term of this patent is extended or adjusted under 35 U.S.C. 154(b) by 0 days.

(21) Appl. No.: 16/551,269

(22) Filed: Aug. 26, 2019

(65) Prior Publication Data

US 2020/0073126 A1 Mar. 5, 2020

Related U.S. Application Data

(60) Provisional application No. 62/724,526, filed on Aug. 29, 2018.

(51) Int. Cl.
*G02B 27/01* (2006.01)
*G06T 11/00* (2006.01)
*F41G 3/14* (2006.01)
*F41G 3/16* (2006.01)

(52) U.S. Cl.
CPC ......... *G02B 27/0172* (2013.01); *F41G 3/145* (2013.01); *F41G 3/165* (2013.01); *G06T 11/00* (2013.01); *G02B 2027/0138* (2013.01); *G02B 2027/0141* (2013.01)

(58) Field of Classification Search
USPC ....................................................... 348/164
See application file for complete search history.

(56) References Cited

U.S. PATENT DOCUMENTS

| 7,773,202 B2 * | 8/2010 | Crawford ................ G01C 3/08 356/4.07 |
| 8,336,777 B1 * | 12/2012 | Pantuso ............... G02B 27/017 235/404 |
| 2006/0121993 A1 | 6/2006 | Scales et al. |

(Continued)

OTHER PUBLICATIONS

Joint Laser Designation Procedures(JLASER), Joint Pub 3-09.1, Jun. 1, 1991. Website: https://fas.org/man/dod-101/sys/smart/jp3_09_1.pdf (Year: 1991).*

(Continued)

*Primary Examiner* — Christopher S Kelley
*Assistant Examiner* — Ana Picon-Feliciano
(74) *Attorney, Agent, or Firm* — K&L Gates LLP

(57) ABSTRACT

Infrared vision systems, headpieces, and methods include an eyepiece and a body module. The eyepiece is configured to be worn over a user's eyes. The eyepiece includes an infrared sensor, configured to detect external infrared information. For example, the infrared sensor may include a plurality of short-wave infrared (SWIR) sensors. The eyepiece includes a display, configured to visually provide external infrared information to the user. For example, the display may include a see-through color display. The body module is in wired or wireless communication with the eyepiece. The eyepiece may include an adjustable strap, coupled to the eyepiece. The adjustable strap is configured to wrap around the user's head.

19 Claims, 6 Drawing Sheets

(56) References Cited

U.S. PATENT DOCUMENTS

| | | | |
|---|---|---|---|
| 2007/0236384 A1* | 10/2007 | Ivtsenkov | G01S 7/481 342/45 |
| 2010/0007580 A1 | 1/2010 | Scales | |
| 2012/0236031 A1* | 9/2012 | Haddick | G06F 3/011 345/633 |
| 2013/0070239 A1* | 3/2013 | Crawford | G01S 17/66 356/139.04 |
| 2015/0309316 A1* | 10/2015 | Osterhout | G06F 3/012 345/8 |
| 2016/0026253 A1* | 1/2016 | Bradski | G02B 27/0172 345/8 |
| 2017/0307333 A1* | 10/2017 | Northrup | G06F 3/011 |
| 2017/0332965 A1* | 11/2017 | Hasegawa | G06Q 50/10 |

OTHER PUBLICATIONS

Joint Tactics, Techniques, and Procedures for Laser Designation Operations, Joint Pub 3-09.1, May 28, 1999. Website: https://apps.dtic.mil/dtic/tr/fulltext/u2/a434233.pdf (Year: 1999).*

Estrera et al., 2003. "Advanced image intensifier night vision system technologies: status and summary 2002", Proc. SPIE 4796, Low-Light-Level and Real-Time Imaging Systems, Components, and Applications, (Feb. 5, 2003); https://doi.org/10.1117/12.450873) (Year: 2003).*

Estrera, 2009(Joseph P. Estrera "Digital image fusion systems: color imaging and low-light targets", Proc. SPIE 7298, Infrared Technology and Applications XXXV, 72981C (May 7, 2009); https://doi.org/10.1117/12.816283) (Year: 2009).*

Haque et al, 2017.( Haque, Mohd Junedul, and Mohd Muntjir. "Night Vision Technology: An Overview." International Journal of Computer Applications 975 (2017): 8887.) (Year: 2017).*

International Search Report and Written Opinion issued in PCT/US2019/048152 dated Jul. 2, 2020, 18 pages.

Rogoway: "Soldiers Will Soon See The Crosshairs From Their Thermal Weapon Sights Projected Into Their Night Vision Goggles—The Drive," May 17, 2016, Retrieved from the Internet: https://www.thedrive.com/the-war-zone/3508/soldiers-will-soon-see-th e rmal-weapo n-sig ht-crosshai rs-projected-into-night-vi si on-goggles.

Anonymous: "BAE entwickelt revolutionares Nachtsichtgerat fur Soldaten—ingenieur.de", May 7, 2015, Retrieved from the Internet: https://www.ingenieur.de/technik/fachbereiche/optoelektronik/bae-entwi eke lt-revol uti o nae res-n achtsichtgeraet-f uer-soldate n/.

Anonymous: "US soldiers to deploy with night vision that shoots around corners—Business Insider", May 17, 2016, Retrieved from the Internet: https://www.businessinsider.com/US-soldiers-to-deploy-with-night-vision-that-shoots-around-corners-2019-4?international=true&r=US&IR= T.

Armyreco: "New helmet night vision ENVG III to accurate fire of weapons without aiming the target with eyes",, Jul. 25, 2015, Retrieved from the Internet: https://www.youtube.com/watch?v=-0J8wU Lwvoo&feature=youtu. be.

Anonymous: "Family of Weapon Sights—Individual (FWS-1)—USAASC",, May 17, 2016, Retrieved from the Internet:: https://asc.army.mil/web/portfolio-item/fws-i/.

Anonymous: "Laser Designation Imaging & Detection I Sensors Unlimited", Jan. 1, 2018, Retrieved from the Internet: http://www.sensorsinc.com/applications/military/laser-designation [retrieved on Jun. 19, 2020].

International Preliminary Report on Patentability issued in PCT/US2019/048152, dated Mar. 11, 2021, 10 pages.

* cited by examiner

COVERT TARGET ACQUISITION WITH CODED SHORT-WAVE INFRARED GLASSES

PRIORITY CLAIM

This application claims priority to U.S. Provisional Application No. 62/724,526, titled "TARGET ACQUISITION WITH CODED SHORT-WAVE INFRARED GLASSES", filed Aug. 29, 2018, the entire contents of which are incorporated herein by reference and relied upon.

BACKGROUND

In today's battlefield, the modern soldier is equipped with a multitude of different gear modules, including survival gear, communications gear, weapons gear, and vision gear. Typically, vision gear assists the soldier in seeing long distances, seeing in the dark, and otherwise seeing things that the soldier would struggle to see with the naked eye. Some well known examples of vision gear include binoculars and night vision goggles. However, vision gear often presents a number of safety, size and weight, power, and cost concerns.

Regarding safety, vision gear is often helmet-mounted, thus increasing the risk of neck injury to the soldier. Regarding size and weight, multiple subsystems and battery types may be required for each individual vision component or device, thus increasing the weight load and total number of components that the soldier must carry. Regarding power, non-integrated vision systems are less efficient and often require individual power and processing, thus increasing the overall power consumption, battery requirements, and associated weight load. Regarding cost, each additional component increases the logistical footprint of the soldier's kit and increases related lifecycle costs.

One typical vision system implemented in today's battlefield is the infrared vision system. For example, by using infrared laser devices, soldiers are able to point out locations, such as waypoints, targets, and the like. Beneficially, infrared lasers typically have wavelengths that are invisible to the naked eye. This allows for covert operations. Detecting infrared laser devices thus requires infrared laser detectors. By using infrared laser detectors, soldiers are able to identify locations, such as waypoints, targets, and the like, which have been indicated by fellow soldiers' infrared laser devices. However, the typical infrared laser device and detector paradigm has many of the same constraints identified above. Namely, the soldier may be required to carry an infrared laser device, for target marking, and an infrared laser detector, for target acquisition. These individual components may be heavy, power-hungry, and expensive. These individual components are also difficult to manage and wield in the battlefield, while a soldier is simultaneously holding a weapon or other heavy equipment.

Improved infrared vision systems, infrared vision headpieces, and methods of implementing infrared vision are therefore needed.

SUMMARY

The devices, systems, and methods disclosed herein improve on infrared vision systems, infrared vision headpieces, and methods of implementing infrared vision, by providing infrared vision detection in an augmented visual display.

In light of the disclosure herein, and without limiting the scope of the invention in any way, in a first aspect of the present disclosure, which may be combined with any other aspect listed herein unless specified otherwise, an infrared vision system includes an eyepiece and a body module. The eyepiece is configured to be worn over a user's eyes. The eyepiece includes an infrared sensor and a display. The infrared sensor is configured to detect external infrared information. The display is configured to visually provide external infrared information to the user. The body module in wired or wireless communication with the eyepiece.

In a second aspect of the present disclosure, which may be combined with any other aspect listed herein unless specified otherwise, the infrared sensor is a short-wave infrared sensor.

In a third aspect of the present disclosure, which may be combined with any other aspect listed herein unless specified otherwise, the infrared sensor detects at least one of a 1035 nm infrared laser and a 1550 nm infrared laser.

In a fourth aspect of the present disclosure, which may be combined with any other aspect listed herein unless specified otherwise, the display is a see-through color display.

In a fifth aspect of the present disclosure, which may be combined with any other aspect listed herein unless specified otherwise, the eyepiece further includes at least one camera configured to capture a field of view of the user.

In a sixth aspect of the present disclosure, which may be combined with any other aspect listed herein unless specified otherwise, the eyepiece further includes at least one infrared diode configured to emit a detectable infrared signal.

In a seventh aspect of the present disclosure, which may be combined with any other aspect listed herein unless specified otherwise, the external infrared information includes at least one of a ground based laser designator and an airborne laser designator.

In an eighth aspect of the present disclosure, which may be combined with any other aspect listed herein unless specified otherwise, the infrared vision system further includes a weapon including an infrared laser designator, such that the external infrared information includes a dynamic location of where the weapon is pointed or aimed.

In a ninth aspect of the present disclosure, which may be combined with any other aspect listed herein unless specified otherwise, the infrared vision system further includes a second eyepiece, worn on a second user, such that the external infrared information includes a dynamic location of where the second user is located.

In a tenth aspect of the present disclosure, which may be combined with any other aspect listed herein unless specified otherwise, the body module includes a battery, and wherein the body module is in wired communication with the eyepiece.

In an eleventh aspect of the present disclosure, which may be combined with any other aspect listed herein unless specified otherwise, an infrared vision headpiece includes an eyepiece and an adjustable strap. The eyepiece is configured to be worn over a user's eyes. The eyepiece includes a plurality of short-wave infrared sensors. The eyepiece includes a see-through color display. The see-through color display is configured to display information detected by the plurality of short-wave infrared sensors. The adjustable strap is coupled to the eyepiece and is configured to wrap around the user's head.

In a twelfth aspect of the present disclosure, which may be combined with any other aspect listed herein unless specified otherwise, the plurality of short-wave infrared sensors includes a high field of view short-wave infrared sensor.

In a thirteenth aspect of the present disclosure, which may be combined with any other aspect listed herein unless specified otherwise, the infrared vision headpiece further includes a plurality of cameras, including at least a narrow field of view camera and a wide field of view camera.

In a fourteenth aspect of the present disclosure, which may be combined with any other aspect listed herein unless specified otherwise, the infrared vision headpiece further includes a plurality of short-wave infrared diodes.

In a fifteenth aspect of the present disclosure, which may be combined with any other aspect listed herein unless specified otherwise, the information detected by the plurality of short-wave infrared sensors includes at least one of a ground based laser designator and an airborne laser designator.

In a sixteenth aspect of the present disclosure, which may be combined with any other aspect listed herein unless specified otherwise, the information detected by the plurality of short-wave infrared sensors includes a weapon based laser designator.

In a seventeenth aspect of the present disclosure, which may be combined with any other aspect listed herein unless specified otherwise, the weapon based laser designator is displayed on the see-through color display as a reticle.

In an eighteenth aspect of the present disclosure, which may be combined with any other aspect listed herein unless specified otherwise, the information detected by the plurality of short-wave infrared sensors includes a location of a friendly troop, the location of the friendly troop indicated by a short-wave infrared diode on a second infrared vision headpiece worn by the friendly troop.

In a nineteenth aspect of the present disclosure, which may be combined with any other aspect listed herein unless specified otherwise, the see-through color display includes a clear display and a tinted display.

In a twentieth aspect of the present disclosure, which may be combined with any other aspect listed herein unless specified otherwise, a method of implementing infrared vision includes emitting, by a short-wave infrared laser designator, a reference point. The method includes detecting, by a plurality of short-wave infrared sensors disposed on an eyepiece, the reference point. The method includes displaying, by a see-through color display disposed on the eyepiece, the reference point. The method includes augmenting, by the see-through color display, a field of view to include the reference point, such that the reference point is dynamically visible in the field of view.

In light of the disclosure and aspects set forth herein, it is accordingly an advantage of the present disclosure to provide systems, headpieces, and related methods that are head-mounted, as opposed to helmet mounted, thus reducing risk of injury to the soldier.

It is another advantage of the present disclosure to provide systems, headpieces, and related methods that reduce the size, weight, and number of individual components carried by the soldier, including moving many of these heavier components from the head to the body.

It is another advantage of the present disclosure to provide systems, headpieces, and related methods that integrate related vision systems, improving power efficiency and reducing battery requirements and related weight loads.

It is yet another advantage of the present disclosure to provide systems, headpieces, and related methods that integrate existing systems, thus reducing the overall logistical footprint and cost of the vision systems.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE FIGURES

Understanding that figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are infrared vision systems, headpieces, and methods of implementing infrared vision, which may advantageously be implemented to quickly acquire and display infrared target information related to laser designators and covert aiming lasers. These infrared vision systems, headpieces, and methods may also advantageously be implemented to acquire and display a personal-coded weapon-mounted laser pointer. Information is displayed to the soldier via an augmented see-through view.

Figure 1:
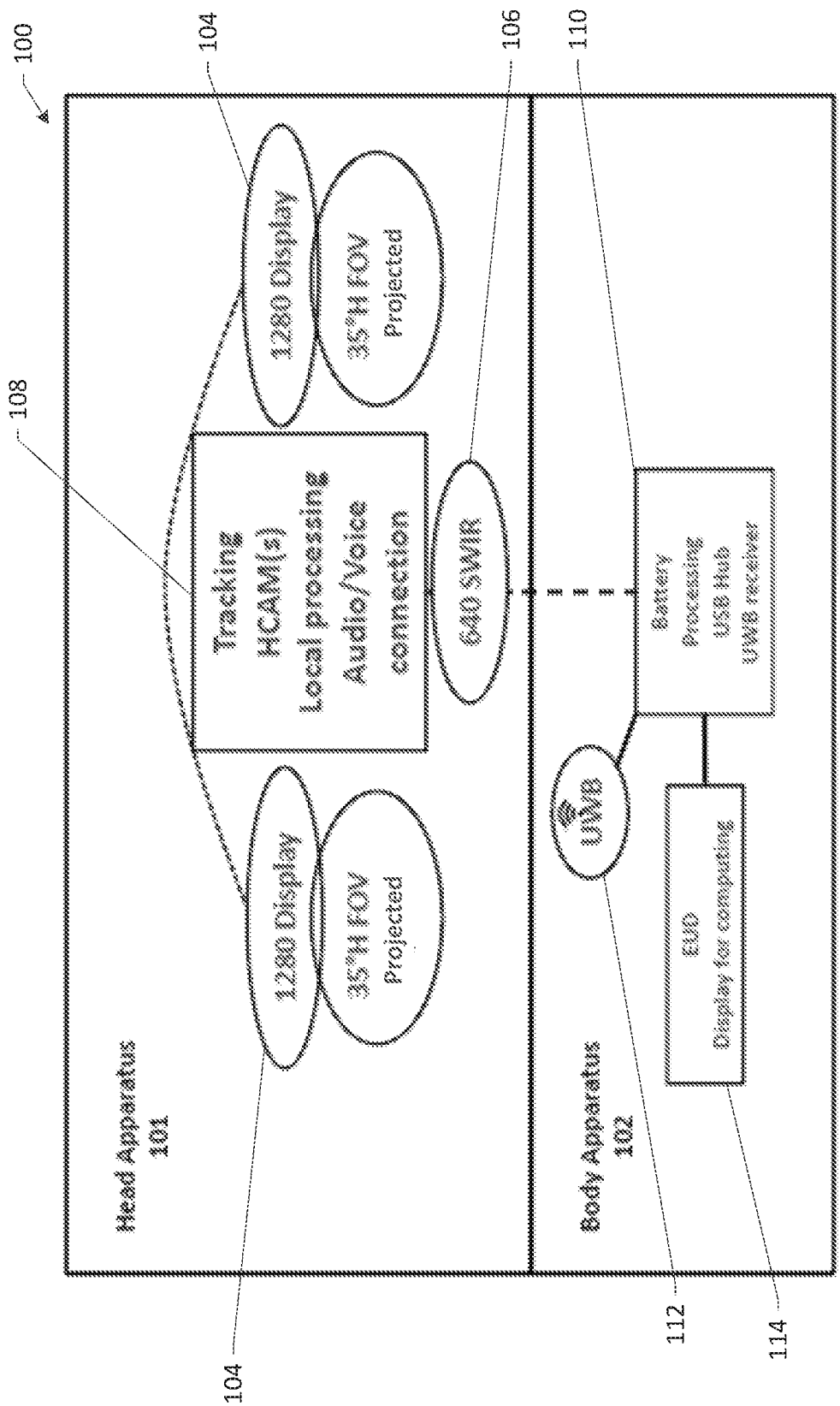
FIG. 1 illustrates an infrared vision system, according to an example embodiment of the present disclosure.

FIG. 1 illustrates an infrared vision system 100 that includes a head apparatus 101 and a body apparatus 102. In a typical embodiment, the head apparatus 101 is disposed on eyeglasses worn on a soldier's head. Likewise, in a typical embodiment, the body apparatus 102 is disposed on a vest worn on the soldier's torso. The body apparatus 102 is in wired or wireless communication with the head apparatus 101.

The head apparatus 101 includes a display 104. The display 104 is configured to provide visual information, such as external infrared information, to the soldier. For example, display 104 may be a see-through color display. In one example, display 104 has 1280×700 resolution, typically referred to as high definition.

It should be appreciated that display 104 is transparent, or at least semi-transparent, such that the soldier can view information on the display while simultaneously viewing the surrounding environment. In this way, display 104 provides an augmented view. In one embodiment, display 104 is a single display, covering the entire viewing area of the soldier's eyes. In a different embodiment, display 104 is two separate and discrete displays, covering each of the soldier's two eyes. For example, when two separate and discrete displays are implemented, each may project approximately a 35-degree field-of view.

The head apparatus 101 further includes an infrared sensor 106. Infrared sensor 106 is typically a short-wave infrared (SWIR) sensor. In various examples, infrared sensor 106 is capable of detecting infrared lasers at wavelengths including 640 nm, 830 nm, 1035 nm, 1064 nm, and 1550 nm. It should be appreciated, however, that other wavelengths are contemplated herein and may therefore be detected by infrared sensor 106. In a particular embodiment, infrared sensor 106 is capable of detecting infrared lasers at covert or classified frequencies. Infrared sensor 106 is generally configured to detect external infrared information from various sources. In particular embodiments, external infrared information can include a ground based laser designator and/or an airborne laser designator. For example, a ground based laser designator may be a handheld laser designator, pointed or aimed by a soldier in the battlefield or in a vehicle. Likewise, for example, an airborne laser designator may be an airplane-mounted, helicopter-mounted, or drone mounted laser designator, pointed or aimed by the airplane, helicopter, or drone in the battlefield. These laser designators, while invisible to the naked eye and to most common laser identification means, are not invisible to infrared sensor 106. Thus, infrared sensor 106 detects external infrared information and passes it along to local module 108.

The head apparatus 101 includes local module 108, which may include a laser tracking module, additional head cameras, local processing and memory, and related audio/visual communication components. The laser tracking module may receive external infrared information, from the infrared sensor 106, and subsequently provide this external infrared information to display 104 (as described in greater detail herein). Beyond the external infrared information, local module 108 may manage additional visual information provided by head cameras or other external cameras, such as visual field information, mission status information, directions, time, or any other meaningful information. Similarly, local module 108 may provide this additional visual information to display 104. Local module 108 may additionally include audio/visual communication components, such as microphones, speakers, additional cameras, and additional displays, for providing and receiving audio or visual information.

Local module 108 may include a processor and a memory, disposed on the head apparatus 101. The processor may include any device capable of executing instructions encoding arithmetic, logical, and/or I/O operations. In an example, a processor may be a single core processor, which is typically capable of executing one instruction at a time (or process a single pipeline of instructions), or a multi-core processor, which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

Likewise, the memory may include any device including a volatile or non-volatile memory device, such as RAM, ROM, EEPROM, or any other device capable of storing data. In an example embodiment, local module 108 includes volatile flash memory configured to store images, symbols, and route locations.

Local module 108 may further include an internal power source, disposed on the head apparatus 101, such as a short-term or temporary battery. As noted previously, the head apparatus 101 is in wired or wireless communication with the body apparatus 102.

The body apparatus 102 includes external module 110, a transceiver 112, and an end user device 114. External module 110 may be implemented to collaborate with local module 108 for information processing and related display. External module 110 may include a processor and a memory, disposed on the body apparatus. It should be appreciated that external module 110 is similar to local module 108, with respect to the types of processing/memory contemplated. External module 110 is ideally configured to collaborate with local module 108, such that most of the processing and data management resources required by the entire infrared vision system 100 are contained within external module 110, and thus disposed on body apparatus 102 as opposed to head apparatus 101.

The body apparatus 102 includes transceiver 112. For example, transceiver 112 may communicate information to head apparatus 101, or to external location such as other head apparatuses, other body apparatuses, or any other location such as a central command post. Information may be communicated via ultra wideband, Bluetooth, nearfield magnetic induction transmission, or other related means. Transceiver 112 may communicate infrared information, such as external infrared information received from infrared sensor 106. Transceiver 112 may communicate display information, such as any information being shown on display 104. Transceiver 112 may communicate any additional audio/visual communication, such as communication information at local module 108 received from any other microphones, speakers, additional cameras, and/or additional displays. Transceiver 112 may communicate with a weapon sight, a GPS receiver, a rifleman radio or multi-power unit, or other related devices.

In an embodiment, body apparatus 102 includes a GPS transceiver/receiver, to indicate the soldier's position in the battlefield. In an embodiment, body apparatus 102 includes an inertial memory unit (IMU), to indicate the soldier's heading direction in the battlefield.

The body apparatus 102 may further include an end user device 114, such as a laptop, tablet, cellphone, or other computing or display device. End user device 114 may include a touchscreen display and/or a keypad. End user device 114 may display information that is simultaneously being shown on display 104, performance metrics of infrared vision system 100, or the like. End user device 114 provides for user interaction with the infrared vision system 100 via an external device.

Figure 2:
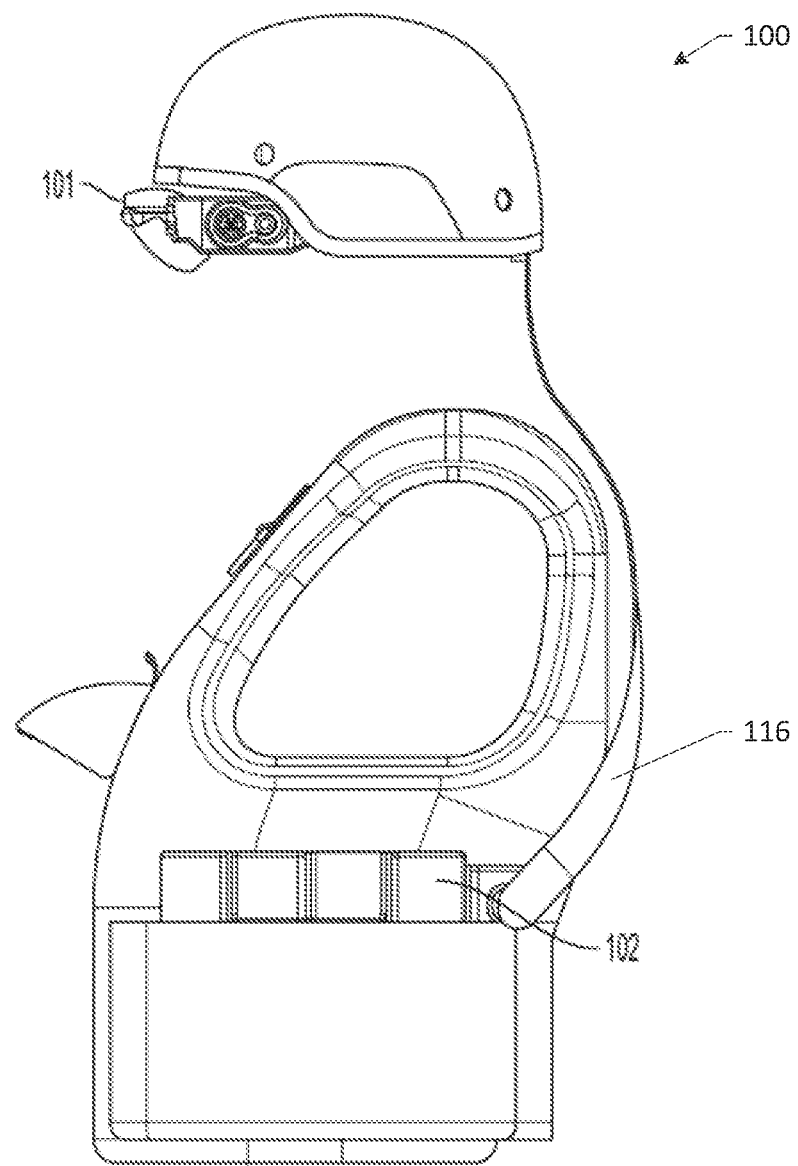
FIG. 2 illustrates a side view of the infrared vision system, according to an example embodiment of the present disclosure.

FIG. 2 illustrates a side view of infrared vision system 100, including head apparatus 101 and body apparatus 102. For example, as previously noted, body apparatus 102 comprises various components and handles most of the processing and communication functions of the infrared vision system 100, so that head apparatus 101 can weigh as little as possible. Body apparatus 102 is typically attached to the soldier's vest or belt.

As noted previously, external module 110 of body apparatus 102 is configured to collaborate with local module 108, such that most of the processing resources required by the entire infrared vision system 100 are contained within external module 110 and thus disposed on body apparatus 102. For example, body apparatus 102 includes an augmented reality module controlling data fusion that is provided to the head apparatus 101. Body apparatus 102 includes memory for storing images, symbols, and route locations, which may be shown on display 104.

Body apparatus 102 is in communication with head apparatus 101. Specifically, for example, body apparatus 102 is in wired or wireless communication with head apparatus 101. For example, body apparatus 102 may be in wireless communication with head apparatus 101, such as via Bluetooth or other related communication means. Alternatively, for example, body apparatus 102 may be in wired communication with head apparatus 101 via cable 116. In an embodiment, cable 116 is additionally used to re-charge head apparatus 101. For example, cable 116 may be attached to body apparatus 102 and head apparatus 101, such that a battery included with body apparatus 102 charges the short-term or temporary battery disposed on head apparatus 101. Body apparatus 102 may further include one or more USB hubs, for connectivity to other external devices, such as end user devices, memory, or the like.

Figure 3A:
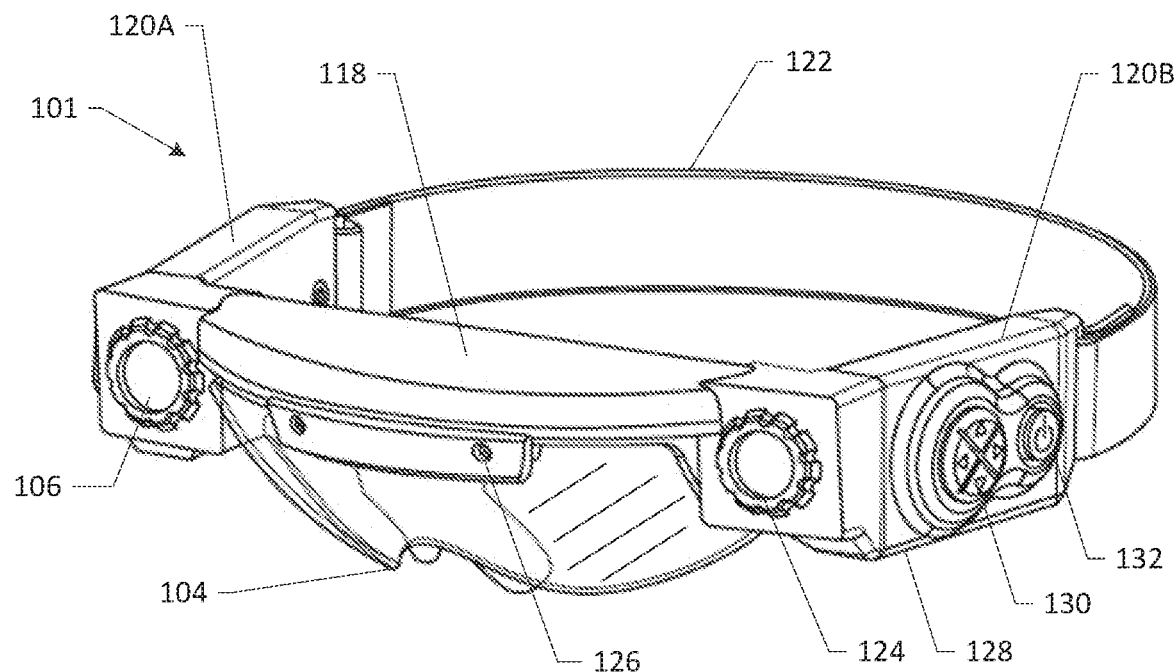
FIGS. 3A to 3B illustrate perspective views of a head apparatus, according to example embodiments of the present disclosure.
Figure 3B:
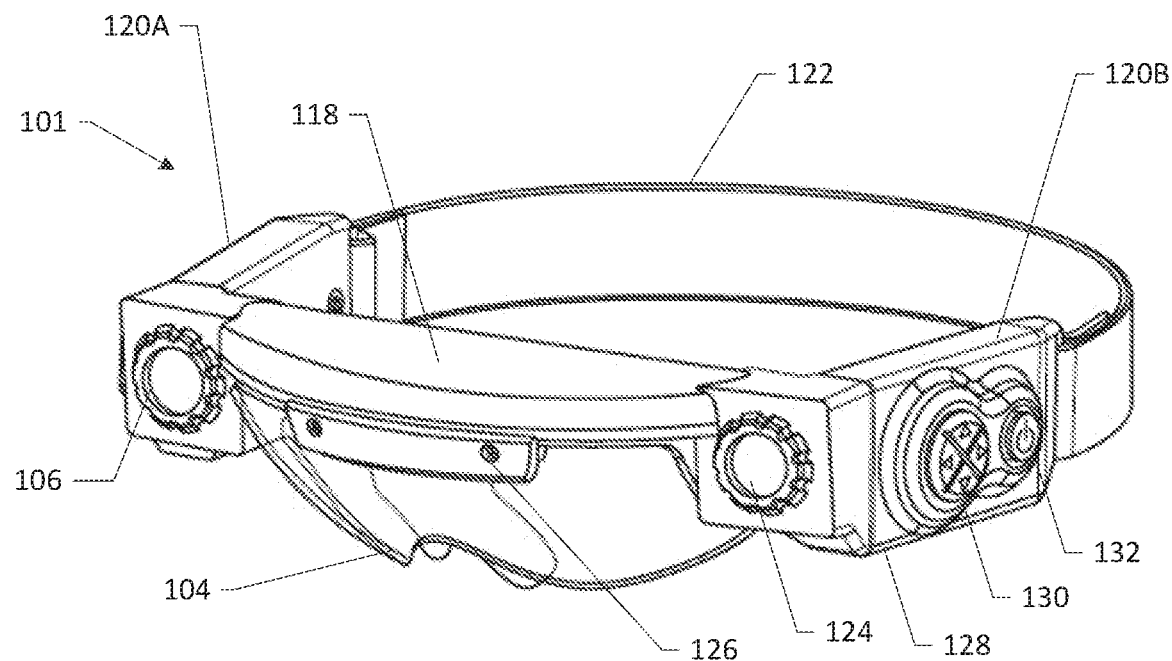

FIGS. 3A to 3B illustrate perspective views of head apparatus 101, according to example embodiments of the present disclosure. Specifically, head apparatus 101 includes a front housing 118 and two lateral housings 120A, 120B. When worn, the front housing 118 is typically disposed along the forehead of the soldier; the lateral housings 120A, 120B are typically disposed along each side of the soldier's head, near the temple. It should be appreciated that the front housing 118 and the lateral housings 120A, 120B are self-contained. Thus, all of the local module 108 of head apparatus 101 is disposed within the front housing 118 and the lateral housings 120A, 120B. For example, one of the lateral housings 120A, 120B includes the short-term or temporary battery for powering display 104, which is rechargeable.

Head apparatus 101 further includes a strap 122, coupled to and disposed between the lateral housings 120A, 120B. For example, strap 122 may be an adjustable strap or band that is configured to wrap around the back of the soldier's head to secure head apparatus 101 to the soldier's head. In an embodiment, strap 122 includes a buckle or clip for easy attachment/removal to at least one of the lateral housings 120A, 120B. In various embodiments, the head apparatus 101 fits under a helmet. Typically, head apparatus 101 is independent from a soldier's helmet and can be used in conjunction with different styles and shapes of helmets.

Continuing on, front housing 118 further includes display 104 (as discussed in detail above). For example, display 104 is disposed as an eyepiece, configured to be worn over the soldier's eyes. As noted previously, display 104 may be two separate optical displays, each one positioned in front of an eye. In another embodiment, display 104 may be a single display positioned in front of both of the eyes. When information is shown on display 104, this information is augmented with the soldier's field of view. In other words, by looking "through" the display 104, the soldier sees the displayed information as being dynamically visible within the soldier's field of view. Display 104 may be configured to display augmented reality inputs, such as laser designation indicators, labels of different laser designations, a reticle of a personal weapon sight, fellow troop locations and related headings, or any other related information detected and provided by the infrared vision system or communicated to the infrared vision system 100, as described in greater detail herein.

In an embodiment, display 104 further includes an LCD visor, as an outer lens, positioned in front of display 104 between display 104 and the external environment. The LCD visor may be constructed of a polycarbonate material and configured to have multiple visibility states. For example, the LCD visor is a single-pixel LCD that can change visibility state. FIG. 3A illustrates display 104 with an LCD visor that has a tinted state; FIG. 3B illustrates display 104 with an LCD visor that has a clear state. For example, the clear state provides approximately 60% light transmission; likewise, for example, the tinted state provides approximately 15 to 20% light transmission In an embodiment, the LCD visor can be set to either visibility state, or other states between these two visibility states. Visibility is controlled, for example, using manual controls, like control panel 128 discussed in greater detail herein. Alternatively, visibility is controlled by an ambient light sensor disposed on head apparatus 101, for automated visibility control.

Head apparatus 101 includes infrared sensor 106. In an embodiment, infrared sensor 106 is a SWIR sensor. For example, infrared sensor 106 captures infrared spectrum light and is configured with asynchronous laser pulse detection (ALPD) and pulse repetition frequency (PRF) decoding. Infrared sensor 106 can detect laser designators within the field of view, with the PRF of a particular laser acting as a unique signature for that particular laser.

In a particular embodiment, infrared sensor 106 is a 640×512 53° H-FOV SWIR sensor. It should be appreciated, however, that infrared sensor 106 disclosed herein could be any related infrared sensor, such as a sensor for detecting a 1035 nm infrared laser, a 1550 nm infrared laser, or any other related wavelengths and PRFs for infrared targeting.

While head apparatus 101 is illustrated with one infrared sensor 106, it should be appreciated that it could include an additional sensor 124, which may be an infrared sensor 106. Inclusion of multiple infrared sensors may improve accuracy associated with ALPD and PRF decoding. Alternatively, additional sensor 124 may be any other number of alternative vision components. For example, additional sensor 124 may be a camera, for displaying a dynamic field of view as witnessed by the soldier. Specifically, additional sensor 124 could be a narrow or wide field of view camera, for capturing images or video in the visible spectrum. If a camera, the additional sensor 124 may provide information, such as the soldier's field of view, to recording means and/or third parties. Likewise, for example, additional sensor 124 may be a binocular or other zoom scope, for providing the soldier with a zoomed view on display 104. It should be appreciated that head apparatus 101 may include a number of additional sensors 124, such as a second infrared sensor 106, a narrow field of view camera, and a wide field of view camera, for example.

Head apparatus 101 includes at least one infrared diode 126. For example, infrared diode 126 is a SWIR LED, which emits a pulsed infrared signal that is detectable by head apparatus 101. Infrared diode 126 may indicate physical position and/or heading of the soldier wearing the head apparatus 101. For example, when a second soldier wearing a second head apparatus is in the field, the infrared diode 126 on the second soldier's head apparatus may emit a pulsed infrared signal; this pulsed infrared signal is detected by the (first) soldier's head apparatus 101 via infrared sensor 106. In this way, information about the dynamic location and heading of the second soldier is identified by the first soldier's head apparatus 101. This information is then shown on display 104. Head apparatus 101 may further include an inertial memory unit (IMU) to provide headings.

In an embodiment, display 104 of head apparatus 101 displays the physical position and/or heading of multiple soldier's wearing the head apparatus 101. For example, when a particular soldier is wearing head apparatus 101, he sees three soldiers shown on his display: two fellow troops and one troop leader. Each of the two fellow troops and one troop leader are wearing head apparatus 101, including the infrared diode 126. The infrared diode 126 of each soldier is illuminated at a different wavelength and/or pulsed at a different frequency, such that each soldier is individually identifiable on the display 104.

Head apparatus 101 may further include a control panel 128, disposed along one of the lateral housings 120A, 120B. For example, control panel 128 may include directional navigation buttons 130 and a power button 132. Directional navigation buttons 130 may be used, for example, to navigate through menus, options, and features shown on display 104. As an example, one menu can include selecting particular color and/or symbol schemes for various ground based laser designators, airborne laser designators, or personnel based infrared diodes 126, or weapon sight based laser designators.

Power button 132 may be used for powering on/off the head apparatus 101. Power button 132 may additionally be used to toggle between tinted and clear states, as previously discussed herein.

While infrared sensor 106 is implemented with head apparatus 101, such as to detect ground based laser designators, airborne laser designators, or personnel based infrared diodes 126, additional infrared laser designators may be implemented in various military kits.

Figure 4:
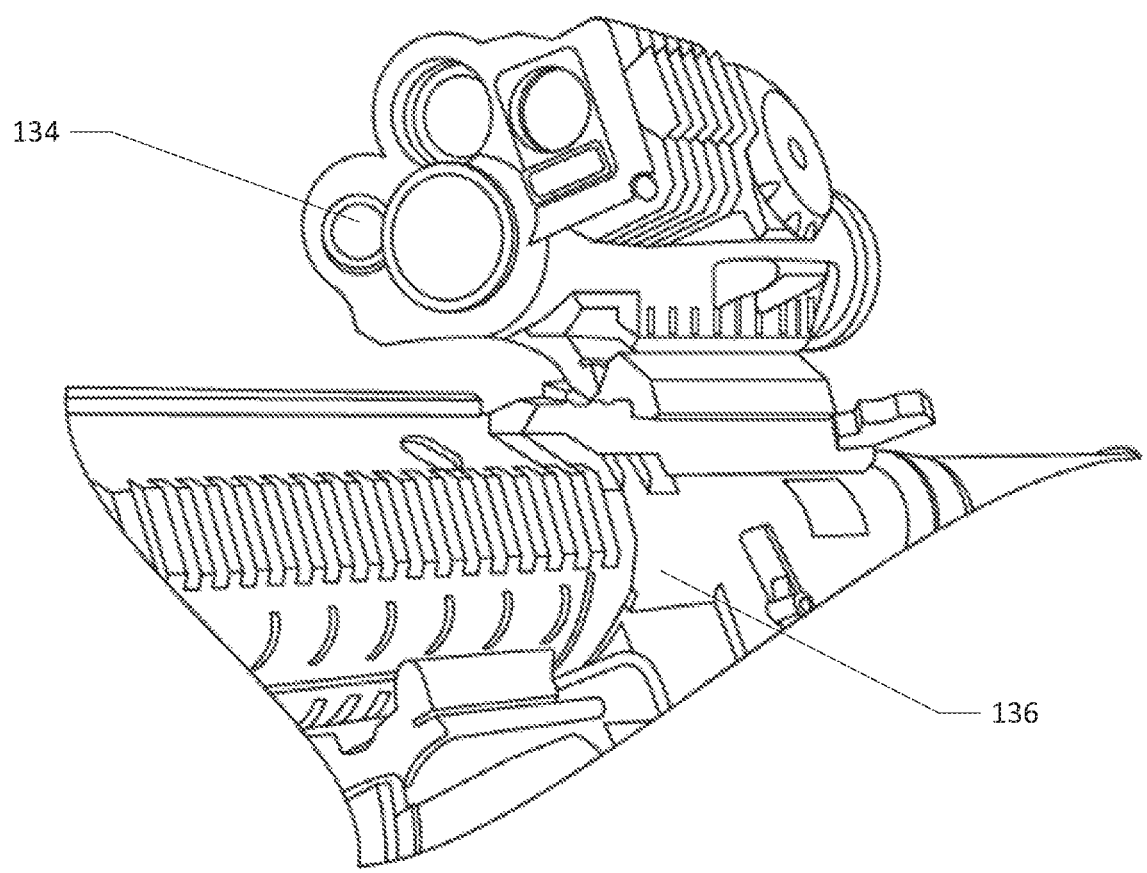
FIG. 4 illustrates a weapon sight component, according to an example embodiment of the present disclosure.

FIG. 4 illustrates a weapon sight based laser designator 134 affixed to the rail of a weapon 136. Specifically, in this embodiment, infrared vision system 100 is configured to acquire and display weapon sight based laser designator 134, which is a personal-coded weapon-mounted laser pointer. Weapon sight based laser designator 134 and can comprise one or more of a second SWIR, a laser range finder, and a coded laser pointer. The coded laser pointer may be bore-sighted to the affixed weapon. The soldier can activate the coded laser pointer manually by using remote, or initiating a button or switch disposed on the rail of the weapon 136. The coded laser pointer uses a code personalized to the weapon sight, which may be selected by the soldier or may be a preset code. The personalized code is then provided to the head apparatus 101 for SWIR detection. The weapon sight based laser designator 134 projects the coded PRF laser pointer, which is subsequently captured, decoded, and shown on display 104. In this way, the display provides a dynamic location of where the weapon 136 is pointed or aimed.

Figure 5A:
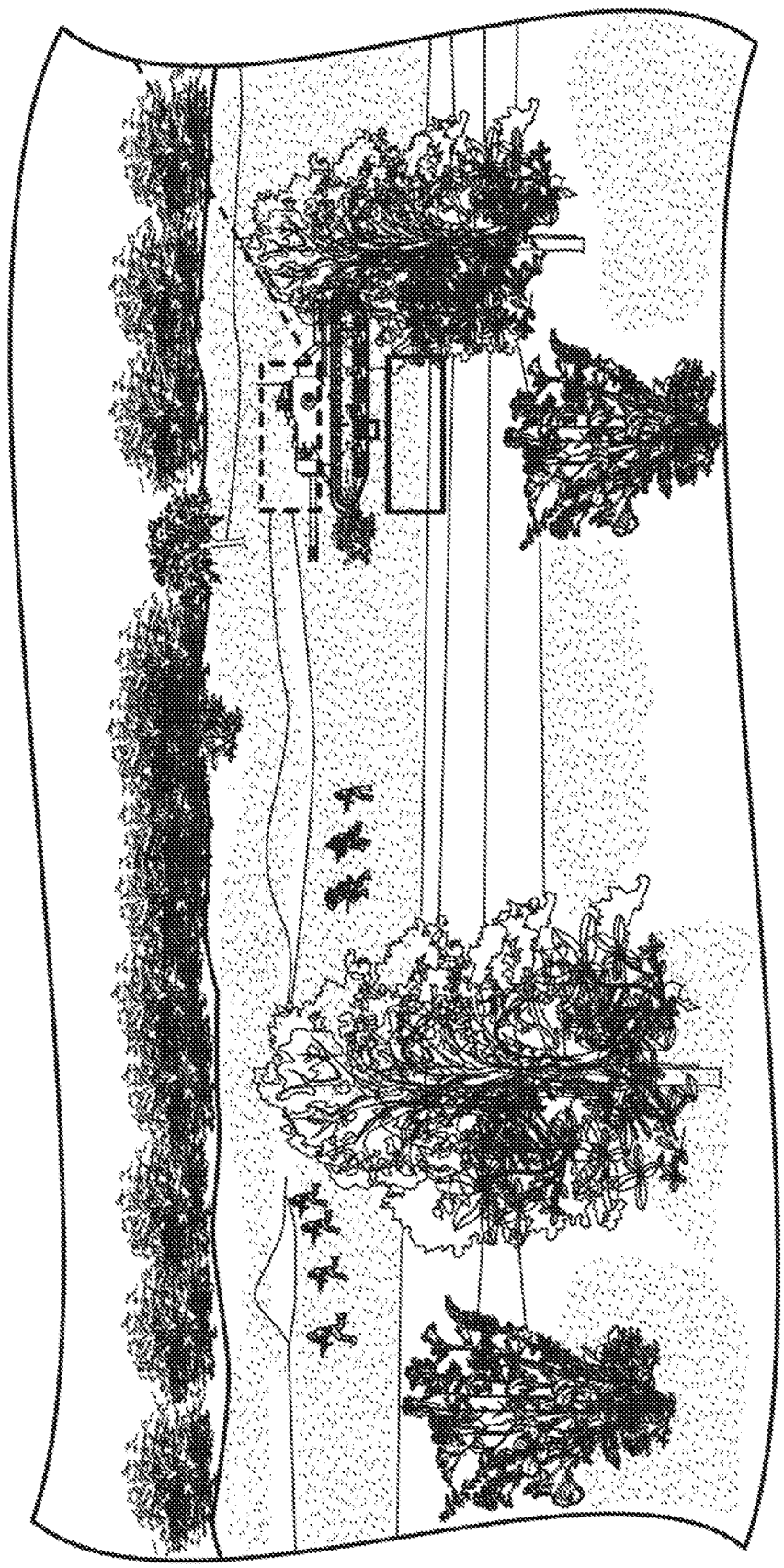
FIGS. 5A to 5B illustrate augmented see-through views incorporating an infrared images captured by a SWIR sensor, according to example embodiments of the present disclosure.
Figure 5B:
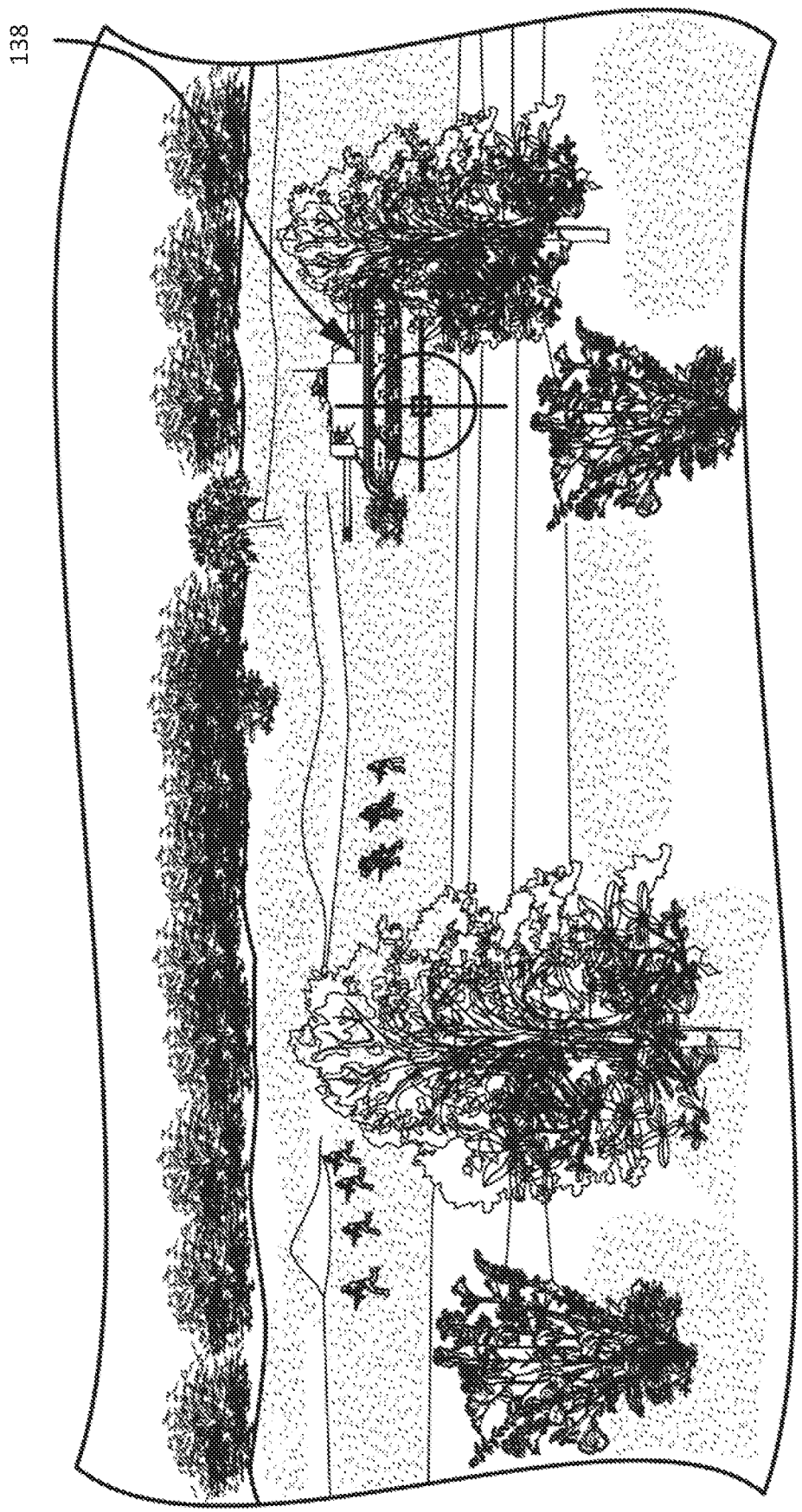

FIGS. 5A to 5B illustrate augmented see-through views incorporating an infrared images captured by infrared sensor 106 and shown on display 104, according to example embodiments of the present disclosure.

For example, FIG. 5A illustrates a soldier's augmented see through view of display 104. By looking through display 104, the soldier is able to see the visible environment as with normal eyesight. However, display 104 provides the soldier with additional information including SWIR images of a ground based laser designator (e.g., PRF 1811) and an airborne laser designator (e.g., PRF 1525), each of which is designating the same target or reference point. In various embodiments, the infrared sensor 106 can be configured to detect coded laser pointers using various PRFs in SWIR or near infrared bands. Thus, FIG. 5A is an example of two laser designators captured by the infrared sensor 106, and the resulting soldier's augmented view. Display 104 is typically a see-through color display. Thus, information from a plurality of laser designators may be presented, and distinguished by number, color, or any other related distinguishing means.

In various embodiments, the pixel resolution of the display 104 is a multiple of the pixel resolution of the infrared sensor 106, to facilitate more efficient processing of the images. The resolution ratio may be 1:1, 2:1 (e.g., 1280 for optical display:640 for infrared sensor 106), 3:1, or any other related resolution ratio. In other embodiments, the pixel resolutions of the optical display and the infrared sensor 106 may not be multiples of each other, as would be understood by one skilled in the art.

Similarly, FIG. 5B illustrates a different augmented see through view of display 104. By looking through display 104, the soldier is able to see the visible environment as with normal eyesight. However, display 104 provides the soldier with additional information including SWIR images of weapon sight based laser designator 134, designating a target or reference point. Weapon sight based laser designator 134 is shown, in the soldier's augmented view, as a reticle 138. Reticle 138 indicates where the soldier's weapon 136 is aimed. The reticle 138 is thus visible on the display 140, in either day or night situations, along with laser designator indicators (such as those discussed above with respect to FIG. 5A). Furthermore, range data obtained by a laser range finder, such as target distance, can be communicated to the head apparatus 101 and shown on display 104. Moreover, any other related information captured or generated by the weapon sight based laser designator 134 can also be communicated to the body apparatus 102 and the helmet apparatus 101.

From the description provided herein, those skilled in the art are readily able to combine software with appropriate general-purpose or special-purpose computer hardware to create a computer system and/or computer subcomponents in accordance with the various embodiments and methods.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

As used in this specification, including the claims, the term "and/or" is a conjunction that is either inclusive or exclusive. Accordingly, the term "and/or" either signifies the presence of two or more things in a group or signifies that one selection may be made from a group of alternatives. As used here, "at least one of," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, C, and C together.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

Note that elements recited in means-plus-function format are intended to be construed in accordance with 35 U.S.C. § 112 ¶6. The scope of the invention is therefore defined by the following claims. Persons of ordinary skill in the art may understand that all or some of the steps of the methods in the embodiments may be implemented by a program instructing relevant hardware (such as a processor). The program may be stored in a computer readable storage medium. The storage medium may include a read-only memory (ROM), a random access memory (RAM), a magnetic disk, or an optical disc.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

The invention is claimed as follows:

1. An infrared vision system, comprising:
   an infrared laser designator configured to forward a personalized code output that is unique to the infrared laser designator;
   a first eyepiece, configured to be worn over a first user's eyes, wherein the first eyepiece includes:
      a first infrared diode coupled to an externally facing front housing of the first eyepiece and configured to forward away from the first user's eyes a first pulsed infrared signal of a non-virtually rendered physical position or heading of the first user wearing the eyepiece when detected by a second infrared sensor configured upon a second eyepiece worn over a second user's eyes by a second user;
      a first infrared sensor coupled to the externally facing front housing of the first eyepiece and configured to detect external infrared information comprising the personalized code output from the infrared laser designator and a second pulsed infrared signal from a second infrared diode of a non-virtually rendered physical position or heading of the second user wearing the second eyepiece;
      a display, configured to visually provide the external infrared information to the first user; and
   a body module in wired or wireless communication with the eyepiece.

2. The infrared vision system of claim 1, wherein the first infrared sensor is a short-wave infrared sensor.

3. The infrared vision system of claim 2 wherein the first infrared sensor detects at least one of a 1035 nm infrared laser and a 1550 nm infrared laser.

4. The infrared vision system of claim 1, wherein the display is a see-through color display.

5. The infrared vision system of claim 1, wherein the first eyepiece further includes at least one camera configured to capture a field of view of the user.

6. The infrared vision system of claim 1, wherein the second pulsed infrared signal is emitted from the second eyepiece to visually provide on the display a physical position or heading of the second user.

7. The infrared vision system of claim 1, wherein the infrared laser designator comprises a ground based laser designator or an airborne laser designator.

8. The infrared vision system of claim 1, wherein the infrared laser designator is coupled to a weapon, such that the external infrared information includes a dynamic location of where the weapon is pointed or aimed.

9. The infrared vision system of claim 1, wherein the second eyepiece, worn on the second user, such that the external infrared information includes a dynamic location of where the second user is located.

10. The infrared vision system of claim 1, wherein the body module includes a battery, and wherein the body module is in wired communication with the eyepiece.

11. An infrared vision system, comprising:
    an infrared laser designator configured to forward a personalized code output that is unique to the infrared laser designator;
    a first eyepiece, configured to be worn over a first user's eyes, wherein the first eyepiece includes:
       a first infrared diode coupled to an externally facing front housing of the first eyepiece and configured to forward away from the first user's eyes a first pulsed infrared signal of a non-virtually rendered physical position or heading of the first user wearing the eyepiece when detected by a second infrared sensor configured upon a second eyepiece worn over a second user's eyes by a second user;
       a first plurality of short-wave infrared sensors configured to detect the personalized code output from the infrared laser designator and a second pulsed infrared signal from a second infrared diode of a non-virtually rendered physical position or heading of a second user wearing the second eyepiece;
       a see-through color display, wherein the see-through color display is configured to display information detected by the first plurality of short-wave infrared sensors; and
    an adjustable strap, coupled to the first eyepiece, wherein the adjustable strap is configured to wrap around the first user's head.

12. The infrared vision system of claim 11, wherein the first plurality of short-wave infrared sensors includes a high field of view short-wave infrared sensor.

13. The infrared vision system of claim 11, further comprising a plurality of cameras, including at least a narrow field of view camera and a wide field of view camera.

14. The infrared vision system of claim 11, further comprising a plurality of short-wave infrared diodes.

15. The infrared vision system of claim 11, wherein the information detected by the first plurality of short-wave infrared sensors includes at least one of a ground based laser designator and an airborne laser designator.

16. The infrared vision system of claim 11, wherein the information detected by the first plurality of short-wave infrared sensors includes a weapon based laser designator.

17. The infrared vision system of claim 16, wherein the weapon based laser designator is displayed on the see-through color display as a reticle.

18. The infrared vision system of claim 11, wherein the information detected by the first plurality of short-wave infrared sensors includes a location of a friendly troop, the location of the friendly troop indicated by a short-wave infrared diode on a second infrared vision headpiece worn by the friendly troop.

19. The infrared vision system of claim 11, wherein the see-through color display includes a clear display and a tinted display.

* * * * *